US011833925B2

(12) United States Patent
Nishioka et al.

(10) Patent No.: US 11,833,925 B2
(45) Date of Patent: Dec. 5, 2023

(54) BATTERY DIAGNOSTIC DEVICE, METHOD, PROGRAM, AND VEHICLE

(71) Applicant: TOYOTA JIDOSHA KABUSHIKI KAISHA, Toyota (JP)

(72) Inventors: Kosuke Nishioka, Toyota (JP); Hideaki Nakamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 136 days.

(21) Appl. No.: 17/374,074

(22) Filed: Jul. 13, 2021

(65) Prior Publication Data

US 2022/0111757 A1 Apr. 14, 2022

(30) Foreign Application Priority Data

Oct. 14, 2020 (JP) ................................. 2020-173391

(51) Int. Cl.
*B60L 58/16* (2019.01)
*B60W 60/00* (2020.01)
*G07C 5/08* (2006.01)

(52) U.S. Cl.
CPC ......... *B60L 58/16* (2019.02); *B60W 60/0023* (2020.02); *G07C 5/0808* (2013.01)

(58) Field of Classification Search
CPC ... B60L 58/16; B60W 60/0023; G07C 5/0808
See application file for complete search history.

(56) References Cited

U.S. PATENT DOCUMENTS

2007/0182378 A1 8/2007 Tsuji
2020/0136427 A1* 4/2020 Heinrich ............. G06F 11/2015
(Continued)

FOREIGN PATENT DOCUMENTS

| CN | 102315666 A | 1/2012 |
|----|-------------|--------|
| CN | 102325670 A | 1/2012 |
| JP | 6-242192 A | 9/1994 |

(Continued)

OTHER PUBLICATIONS

English Translation of JP-2014167450-A (Year: 2014).*

*Primary Examiner* — James J Lee
*Assistant Examiner* — Jonathan E Reinert
(74) *Attorney, Agent, or Firm* — Oblon, McClelland, Maier & Neustadt, L.L.P.

(57) ABSTRACT

A battery diagnostic device includes a first discharge process unit that performs a first diagnostic discharge, a first determination unit that determines whether a deterioration diagnosis of the battery is possible based on a physical quantity indicating the state of the battery during the first diagnostic discharge acquired by a first acquisition unit, a second discharge process unit that performs a second diagnostic discharge when it is determined that the deterioration diagnosis of the battery is impossible, and a diagnosis unit that performs the deterioration diagnosis of the battery based on the physical quantity acquired by the first acquisition unit when it is determined that the deterioration diagnosis of the battery is possible, and performs the deterioration diagnosis of the battery based on a physical quantity indicating the state of the battery during the second diagnostic discharge when it is determined that the deterioration diagnosis of the battery is impossible.

9 Claims, 3 Drawing Sheets

(56) References Cited

U.S. PATENT DOCUMENTS

2020/0298888 A1    9/2020   Ozeki et al.
2021/0138929 A1*   5/2021   Kazuno ................... B60L 58/12

FOREIGN PATENT DOCUMENTS

| JP | 2002-216857 A | | 8/2002 |
|---|---|---|---|
| JP | 2007-205798 A | | 8/2007 |
| JP | 2011-45182 A | | 3/2011 |
| JP | 2011-257372 A | | 12/2011 |
| JP | 2014167450 A | * | 9/2014 |
| JP | 2020-156228 A | | 9/2020 |

* cited by examiner

BATTERY DIAGNOSTIC DEVICE, METHOD, PROGRAM, AND VEHICLE

CROSS-REFERENCE TO RELATED APPLICATION

This application claims priority to Japanese Patent Application No. 2020-173391 filed on Oct. 14, 2020, incorporated herein by reference in its entirety.

BACKGROUND

1. Technical Field

The present disclosure relates to a battery diagnostic device and the like that diagnose a state of a battery mounted on a vehicle.

2. Description of Related Art

Japanese Unexamined Patent Application Publication No. 2007-205798 (JP 2007-205798 A) discloses a battery diagnostic device that diagnoses a state of a battery mounted on a personal computer. In the battery diagnostic device described in JP 2007-205798 A, various devices mounted on a personal computer are controlled to bring a value of a current discharged from the battery to the device close to a value of a diagnostic discharge current set in advance. Therefore, the diagnostic accuracy of the battery is improved.

SUMMARY

When the diagnostic method for the computer-mounted battery described in JP 2007-205798 A is applied to a battery mounted on a vehicle, a current larger than the diagnostic discharge current may be requested from a device (in-vehicle device). When the current larger than the discharge current is requested from the device (in-vehicle device) during the diagnostic discharge, the value of the diagnostic discharge current becomes unstable, which causes a problem that the diagnostic accuracy of the battery is lowered.

The present disclosure is to provide a battery diagnostic device and the like capable of improving diagnostic accuracy of a battery.

A first aspect of the present disclosure relates to a battery diagnostic device that diagnoses a state of a battery mounted on a vehicle. The battery diagnostic device includes a first discharge process unit that performs a first diagnostic discharge that discharges from the battery toward a predetermined in-vehicle device for a first time, a first acquisition unit that acquires a physical quantity indicating the state of the battery during the first diagnostic discharge, a first determination unit that determines whether or not a deterioration diagnosis of the battery is possible based on the physical quantity acquired by the first acquisition unit, a second discharge process unit that performs a second diagnostic discharge that discharges from the battery toward the in-vehicle device for the first time when the first determination unit determines that the deterioration diagnosis of the battery is not possible, a second acquisition unit that acquires a physical quantity indicating the state of the battery during the second diagnostic discharge, and a diagnosis unit that performs the deterioration diagnosis of the battery based on the physical quantity acquired by the first acquisition unit when the first determination unit determines that the deterioration diagnosis of the battery is possible, and performs the deterioration diagnosis of the battery based on the physical quantity acquired by the second acquisition unit when the first determination unit determines that the deterioration diagnosis of the battery is not possible.

With the battery diagnostic device of the present disclosure, when a current larger than a discharge current is requested from the in-vehicle device during performing the diagnostic discharge, the diagnostic discharge is performed again during a period in which the current requested by the in-vehicle device does not exceed the discharge current. Therefore, it is possible to improve diagnostic accuracy of the battery.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The present disclosure is a battery diagnostic device that performs a deterioration diagnosis of a sub-battery that can back up a main battery during autonomous driving. When a highly accurate physical quantity capable of being used for the deterioration diagnosis of the sub-battery cannot be acquired by an initial diagnostic discharge process, the battery diagnostic device repeats the diagnostic discharge process a plurality of times to acquire the physical quantity. This process increases a possibility of acquiring the highly accurate physical quantity. Therefore, it is possible to increase a chance capable of performing the deterioration diagnosis of the sub-battery. Hereinafter, an embodiment of the present disclosure will be described in detail with reference to drawings.

Embodiment

Configuration

Figure 1:
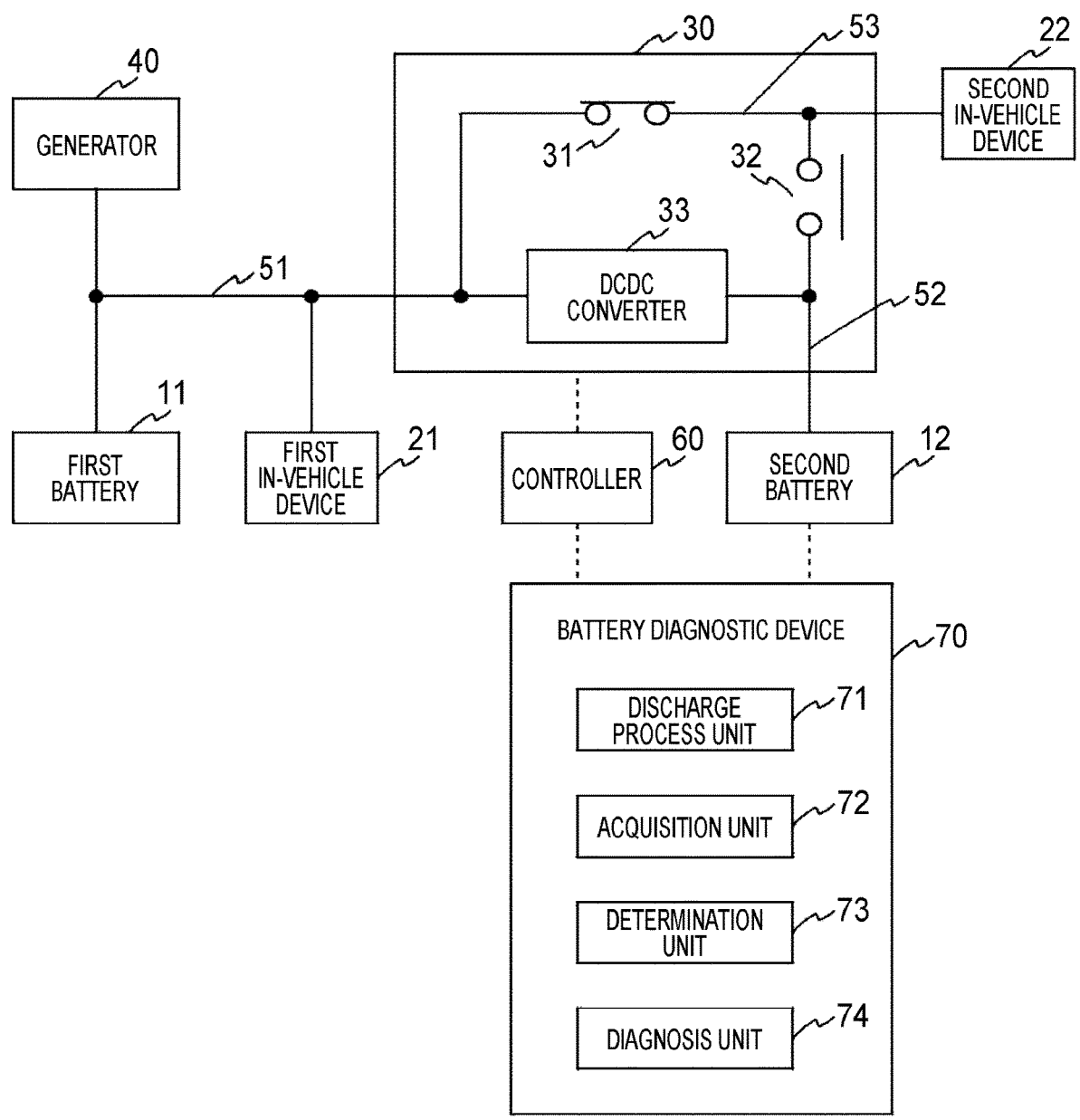
FIG. 1 is a functional block diagram of a battery diagnostic device and a peripheral portion thereof according to an embodiment.

FIG. 1 is a functional block diagram of a battery diagnostic device 70 and a peripheral portion thereof according to an embodiment of the present disclosure. Functional blocks illustrated in FIG. 1 include a first battery 11, a second battery 12, a first in-vehicle device 21, a second in-vehicle device 22, a connection switching unit 30, a generator 40, a controller 60, and the battery diagnostic device 70.

The first battery 11, the first in-vehicle device 21, the connection switching unit 30, and the generator 40 are connected by a first power line 51. The second battery 12 and the connection switching unit 30 are connected by a second power line 52. The second in-vehicle device 22 and the connection switching unit 30 are connected by a third power line 53. The second battery 12, the connection switching unit 30, the controller 60, and the battery diagnostic device 70 are connected by a signal line (dotted line in FIG. 1), and control signals, measured values, and the like are transmitted and received.

A case where the battery diagnostic device 70 according to the present embodiment is mounted on a vehicle configured to switch between manual driving and autonomous driving and provided with a power source system that requests a redundant power source configuration will be described as an example.

The generator 40 is a device capable of outputting predetermined electric power, such as an alternator or a DCDC converter. The electric power output by the generator 40 is supplied to the first battery 11, the first in-vehicle device 21, and the like.

The first battery 11 is a secondary battery configured to be chargeable and dischargeable, such as a lead storage battery or a lithium ion battery. The first battery 11 stores the electric power output by the generator 40 or discharges the electric power stored by the first battery 11 to the first in-vehicle device 21 and the connection switching unit 30. The first battery 11 is provided as a main battery exclusively used for traveling of the vehicle.

The second battery 12 is the secondary battery configured to be chargeable and dischargeable, such as the lead storage battery or the lithium ion battery. The second battery 12 stores the electric power output by the generator 40 and the electric power of the first battery 11 through the connection switching unit 30 or discharges (supplies) the electric power stored by the second battery 12 to the second in-vehicle device 22 and the like through the connection switching unit 30. The second battery 12 is provided redundantly such that a backup process that maintains the supply of the power source to the second in-vehicle device 22, responsible for the autonomous driving, instead of the first battery 11 is possible even when the first battery 11 is lost during the autonomous driving.

The first in-vehicle device 21 is a load that consumes the electric power mounted on the vehicle. The first in-vehicle device 21 is configured to operate with the electric power output from the generator 40 and/or the electric power stored in the first battery 11.

The second in-vehicle device 22 is a load that consumes the electric power mounted on the vehicle and can be a device that requests a more stable electric power supply than the first in-vehicle device 21 during the autonomous driving of the vehicle. More specifically, the second in-vehicle device 22 is a key device relating to safe traveling of the vehicle that requests the electric power supply from the second battery 12 for a predetermined period and by a predetermined current even when the power source by the first battery 11 is lost, and can be a device responsible for a key function for causing the vehicle to safely retreat in an emergency in the autonomous driving, for example. The second in-vehicle device 22 is configured to operate with the electric power output from the generator 40 and/or the electric power stored in the first battery 11 during the manual driving and to operate with the electric power output from the generator 40 and/or the electric power stored in the first battery 11, which are subjected to voltage control by a DCDC converter 33, and the electric power stored in the second battery 12 during the autonomous driving.

The connection switching unit 30 includes a first switch 31, a second switch 32, and the DCDC converter 33 in a configuration thereof. The first switch 31 is disposed so as to be openable and closable between the first power line 51 and the third power line 53. The second switch 32 is disposed so as to be openable and closable between the second power line 52 and the third power line 53. For example, a semiconductor relay, a mechanical relay, or the like can be used as the first switch 31 and the second switch 32. The DCDC converter 33 is a voltage converter that is disposed between the first power line 51 and the second power line 52, converts a voltage of the input electric power into a predetermined voltage, and outputs the converted voltage. The DCDC converter 33 can be, for example, a step-up and down DCDC converter having both a step-down function that steps down a voltage on a primary side and outputs the voltage to a secondary side and a step-up function that steps up a voltage on the secondary side and outputs the voltage to the primary side.

The controller 60 is configured of, for example, an autonomous driving electronic control unit (ECU) including a microcomputer and the like, and controls an open and close state of the first switch 31 and the second switch 32 of the connection switching unit 30 and a voltage instruction value of the DCDC converter 33 based on vehicle information (ignition ON AND OFF state, manual driving and autonomous driving state, and the like) acquired from the in-vehicle device (not shown).

Specifically, when the vehicle is in the manual driving state, the controller 60 closes the first switch 31 to connect the first power line 51 and the third power line 53 and opens the second switch 32 to disconnect the second power line 52 and the third power line 53. Accordingly, the electric power output by the generator 40 and/or the electric power stored in the first battery 11 are directly supplied to the second in-vehicle device 22. On the other hand, when the vehicle is in the autonomous driving state, the controller 60 opens the first switch 31 to disconnect the first power line 51 and the third power line 53 and closes the second switch 32 to connect the second power line 52 and the third power line 53. Accordingly, the electric power output from the generator 40 and/or the electric power stored in the first battery 11 are indirectly supplied to the second in-vehicle device 22 through the DCDC converter 33.

The battery diagnostic device 70 is a device that diagnoses the state of the second battery 12, and more specifically, can diagnose the deterioration of the second battery 12. The battery diagnostic device 70 includes a discharge process unit 71, an acquisition unit 72, a determination unit 73, and a diagnosis unit 74 in a configuration thereof.

Figure 2:
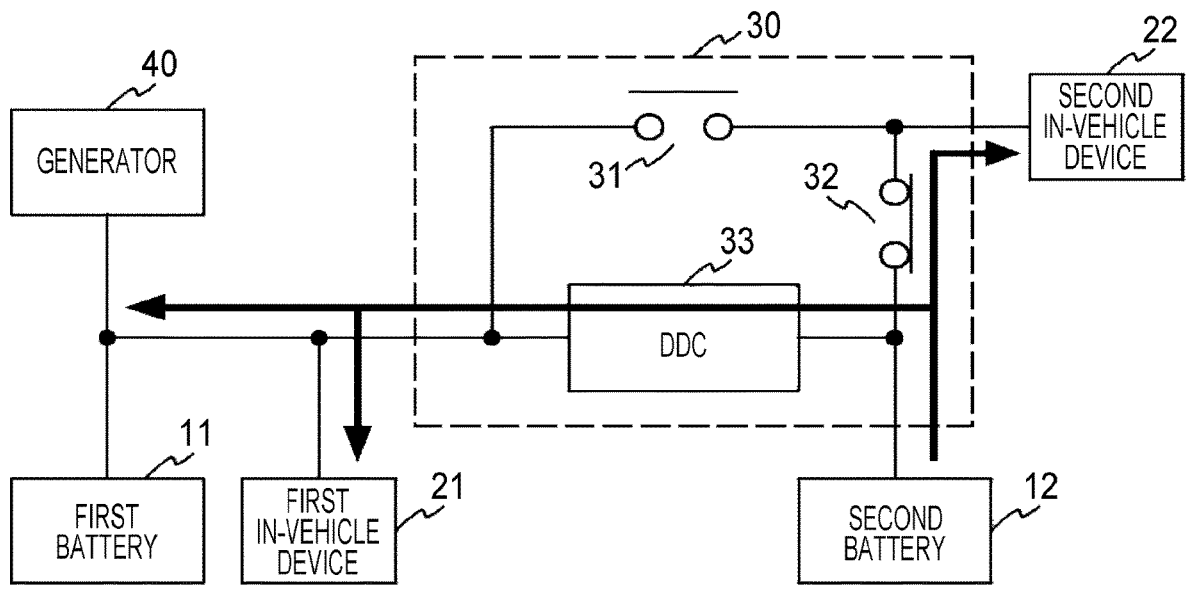
FIG. 2 is a diagram showing a current path discharged from a second battery in a diagnostic discharge process.
Figure 3:
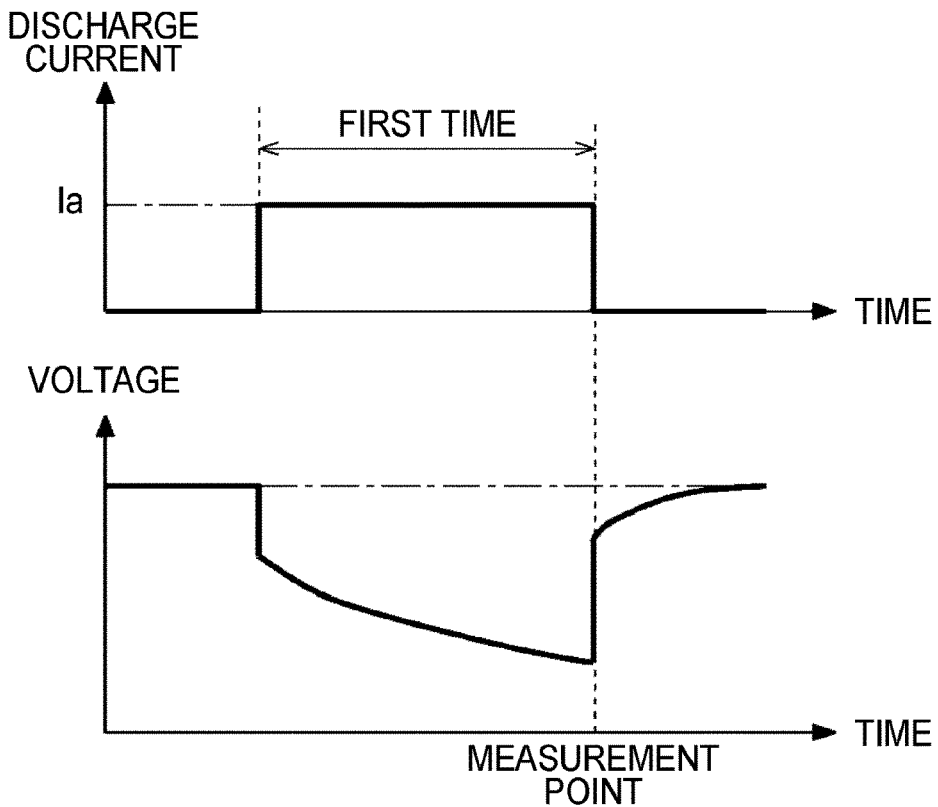
FIG. 3 is a graph showing an example of a change in a physical quantity of the second battery in the diagnostic discharge process.

When a timing for performing the deterioration diagnosis of the second battery 12 comes, the discharge process unit 71 performs the diagnostic discharge process that discharges from the second battery 12 toward the first in-vehicle device 21 and the second in-vehicle device 22 for a first time. FIG. 2 shows a discharge path of a current (arrow in FIG. 2) in the diagnostic discharge process performed by the discharge process unit 71. The current is discharged to the first in-vehicle device 21 through the DCDC converter (DDC) 33 and is discharged to the second in-vehicle device 22 through the second switch 32. FIG. 3 shows changes in an outflow current and an output voltage of the second battery 12 during the diagnostic discharge. As shown in FIG. 3, the DCDC converter (DDC) 33 controls the current of a constant value Ia to continuously flow out from the second battery 12 for the first time during the diagnostic discharge. The constant value Ia is appropriately set based on a current (backup actual current) that is requested to be continuously supplied from the second battery 12 to the second in-vehicle device 22 for the first time (for example, 15 seconds) during the backup process. The diagnostic discharge process may be further repeated once or twice according to a determination result of the determination unit 73 described below.

The acquisition unit 72 acquires a physical quantity indicating the state of the second battery 12 while the discharge process unit 71 performs the diagnostic discharge process. The physical quantity indicating the state of the second battery 12 can be acquired from a detection device, such as a sensor (not shown) mounted on the vehicle. Examples of the physical quantity indicating the state of the second battery 12 include a voltage, a current, and a temperature. In the present embodiment, the acquisition unit 72 acquires the current (outflow current) and the output voltage discharged from the second battery 12 as the physical quantity. The acquisition unit 72 can also acquire an internal resistance and a stored electricity amount (state of charge: SOC) from the voltage, the current, and the temperature.

The determination unit 73 determines whether or not the diagnosis relating to the deterioration of the second battery 12 is possible based on the physical quantity indicating the state of the second battery 12 acquired by the acquisition unit 72. The deterioration diagnosis of the second battery 12 is performed depending on, for example, whether or not electric power that can be supplied by the second battery 12, which is derived from the outflow current and the output voltage of the second battery 12 obtained by the diagnostic discharge process, satisfies electric power that is requested as a backup power source for the first battery 11. Therefore, accuracy of the outflow current and the output voltage of the second battery 12 acquired by the acquisition unit 72 is requested. The determination unit 73 determines whether or not the deterioration diagnosis of the second battery 12 is possible based on whether or not the accuracy of the outflow current and the output voltage of the second battery 12 acquired by the acquisition unit 72 is high. The accuracy of the outflow current and output voltage of the second battery 12 will be described below.

When the determination unit 73 determines that the diagnosis relating to the deterioration of the second battery 12 is possible, the diagnosis unit 74 performs the deterioration diagnosis of the second battery 12 based on the physical quantities (outflow current and output voltage) indicating the state of the second battery 12 acquired by the acquisition unit 72. The deterioration diagnosis diagnoses whether or not there is a state where the second battery 12 can back up the first battery 11 when the first battery 11 is lost.

A part or all of the battery diagnostic device 70 described above may typically be configured as an electronic control unit (ECU) including a processor such as a microcomputer, a memory, an input and output interface, and the like. In the electronic control unit, the processor can read and execute a program stored in the memory to realize a part or all of functions of the discharge process unit 71, the acquisition unit 72, the determination unit 73, and the diagnosis unit 74.

Control

Figure 4:
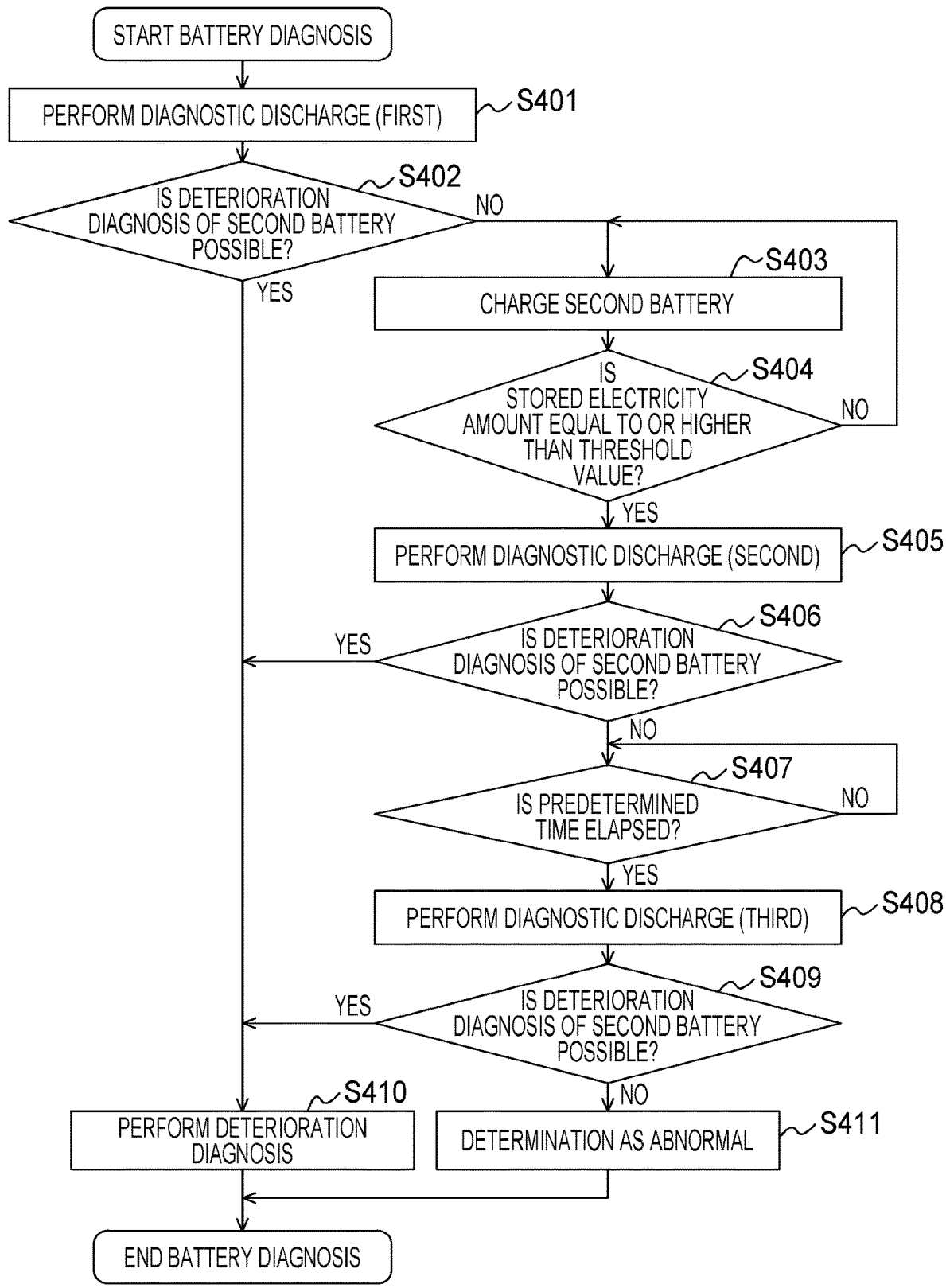
FIG. 4 is a flowchart of the battery diagnostic process executed by the battery diagnostic device.

Next, control executed by the battery diagnostic device 70 according to the present embodiment will be described with reference to FIG. 4. FIG. 4 is a flowchart describing a procedure of a diagnostic process (battery diagnostic process) relating to the deterioration of the second battery 12 executed by each configuration of the battery diagnostic device 70 during the manual driving.

The battery diagnostic process illustrated in FIG. 4 is started when the power source of the vehicle is turned on and is repeatedly executed at a predetermined timing until the power source is turned off while the traveling by the manual driving is performed. The battery diagnostic process ends at the time when the traveling by the manual driving is switched to the traveling by the autonomous driving.

Step S401

The discharge process unit 71 performs a first diagnostic discharge process. This process corresponds to a first diagnostic discharge performed by a first discharge process unit according to claims. As described above, the diagnostic discharge is performed by causing the current of the constant value Ia to flow for the first time (FIG. 3) from the second battery 12 toward the first in-vehicle device 21 and the second in-vehicle device 22 (FIG. 2). While the diagnostic discharge is performed, the acquisition unit 72 acquires the physical quantity of the second battery 12 as appropriate. This process corresponds to the acquisition of the physical quantity by a first acquisition unit in claims. When the first diagnostic discharge process is performed, the process proceeds to step S402.

Step S402

The determination unit 73 determines whether or not the diagnosis relating to the deterioration of the second battery 12 is possible. This process corresponds to determination of whether or not the diagnosis is possible by a first determination unit in claims. This determination is made depending on, for example, whether or not the following conditions are satisfied, based on the physical quantity of the second battery 12 acquired by the acquisition unit 72.

(1) An average value of the outflow current of the second battery 12 in the first time, which is a discharge period, is not equal to or higher than a first threshold value.

(2) The outflow current of the second battery 12 at the time of the end of discharge (measurement point in FIG. 3) after the first time has elapsed is not equal to or higher than a second threshold value.

The condition (1) assumes a situation in which a large current demand that cannot be absorbed by the control of the DCDC converter 33 occurs in the second in-vehicle device 22. In such a situation, the current supplied from the second battery 12 to the second in-vehicle device 22 is disturbed during the diagnostic discharge. Therefore, the deterioration of the battery cannot be correctly diagnosed by the physical quantity of the second battery 12 acquired by the acquisition unit 72. Therefore, the determination of the condition (1) is made. The first threshold value is appropriately set based on the current of the constant value Ia flowing in the first diagnostic discharge and the backup actual current.

The condition (2) assumes a situation in which the outflow current of the second battery 12 changes significantly at the end of discharge after the first time has elapsed even when the above condition (1) is satisfied. In such a situation, suppliable electric power (=outflow current×output voltage) of the second battery 12 derived from the physical quantity of the second battery 12 acquired by the acquisition unit 72 fluctuates. Therefore, the deterioration of the battery cannot be correctly diagnosed. Therefore, the determination of the condition (2) is made. The second threshold value is appropriately set based on the supplying electric power requested for the second battery 12 as the backup power source for the first battery 11.

When any one of these conditions (1) and (2) is not satisfied, that is, when the average value of the outflow current of the second battery 12 in the first time is equal to or higher than the first threshold value or the outflow current of the second battery 12 at the time of the end of discharge after the lapse of the first time is equal to or higher than the second threshold value, the determination unit 73 determines that the deterioration diagnosis of the battery is not possible (not possible). When the deterioration diagnosis of the second battery 12 is possible (S402, YES), the process proceeds to step S410. When the deterioration diagnosis of the second battery 12 is not possible (S402, NO), the process proceeds to step S403.

Step S403

The discharge process unit 71 charges the second battery 12 in preparation for a second diagnostic discharge process. This charging is performed by the discharge process unit 71 instructing the controller 60 to control the DCDC converter 33. When the second battery 12 is charged, the process proceeds to step S404.

Step S404

The discharge process unit 71 determines whether or not a stored electricity amount in the second battery 12 has reached a predetermined stored electricity amount (first stored electricity amount). This determination is made in preparation for a case where a third diagnostic discharge process is subsequently performed after the second diagnostic discharge process. That is, the stored electricity amount in the second battery 12 is increased in advance such that the stored electricity amount in the second battery 12 does not excessively decrease even when the diagnostic discharge is continuously performed twice. When the charging is continued until the stored electricity amount in the second battery 12 reaches the first stored electricity amount (S404, NO) and the stored electricity amount in the second battery 12 reaches the first stored electricity amount (S404, YES), the process proceeds to step S405.

Step S405

The discharge process unit 71 performs the second diagnostic discharge process. This process corresponds to a second diagnostic discharge performed by a second discharge process unit according to claims. The diagnostic discharge is as described above. The second diagnostic discharge process is desired to be performed during a period in which the large current demand from the second in-vehicle device 22 that occurs in the first diagnostic discharge process does not occur, in order to stabilize the outflow current of the second battery 12. While the diagnostic discharge is performed, the acquisition unit 72 acquires the physical quantity of the second battery 12 as appropriate. This process corresponds to the acquisition of the physical quantity by a second acquisition unit in claims. When the second diagnostic discharge process is performed, the process proceeds to step S406.

Step S406

The determination unit 73 determines whether or not the diagnosis relating to the deterioration of the second battery 12 is possible. This process corresponds to the determination of whether or not the diagnosis is possible by a second determination unit in claims. This determination is as described above. When the deterioration diagnosis of the second battery 12 is possible (S406, YES), the process proceeds to step S410. When the deterioration diagnosis of the second battery 12 is not possible (S406, NO), the process proceeds to step S407.

Step S407

The discharge process unit 71 determines whether or not a predetermined time (second time) has elapsed since the second diagnostic discharge process ends. This determination is made in preparation for the third diagnostic discharge process. That is, since there is a possibility that the second battery 12 is polarized immediately after a discharge at a constant current (CC discharge) is performed by the second diagnostic discharge process, the third diagnostic discharge process is performed to eliminate the influence of the polarization. Therefore, the predetermined time (second time) is set to a sufficient time until the polarization of the second battery 12 is eliminated. When time-counting is continuously performed until the predetermined time elapses (S407, NO) and the predetermined time elapses (S407, YES), the process proceeds to step S408.

Step S408

The discharge process unit 71 performs the third diagnostic discharge process. This process corresponds to a third diagnostic discharge performed by a third discharge process unit according to claims. The diagnostic discharge is as described above. The reason for performing the third diagnostic discharge process following the second diagnostic discharge process is that there is a high possibility that the large current demand does not occur in the third diagnostic discharge process even when the large current demand from the second in-vehicle device 22 occurs in the second diagnostic discharge process. While the diagnostic discharge is performed, the acquisition unit 72 acquires the physical quantity of the second battery 12 as appropriate. This process corresponds to the acquisition of the physical quantity by a third acquisition unit in claims. When the third diagnostic discharge process is performed, the process proceeds to step S409.

Step S409

The determination unit 73 determines whether or not the diagnosis relating to the deterioration of the second battery 12 is possible. This process corresponds to the determination of whether or not the diagnosis is possible by a third determination unit in claims. This determination is as described above. When the deterioration diagnosis of the second battery 12 is possible (S409, YES), the process proceeds to step S410. When the deterioration diagnosis of the second battery 12 is not possible (S409, NO), the process proceeds to step S411.

Step S410

The diagnosis unit 74 performs the diagnosis relating to the deterioration of the second battery 12. The deterioration diagnosis is performed depending on whether or not the electric power that can be supplied by the second battery 12 can ensure the electric power that can back up the first battery 11 when the first battery 11 is lost, based on the physical quantity of the second battery 12 acquired by the acquisition unit 72. More specifically, when determination is made that the deterioration diagnosis of the second battery 12 is possible in the first diagnostic discharge process, the physical quantity of the second battery 12 acquired by the acquisition unit 72 during the first diagnostic discharge process is used for the diagnosis. When determination is made that the deterioration diagnosis of the second battery 12 is possible in the second diagnostic discharge process, the physical quantity of the second battery 12 acquired by the acquisition unit 72 during the second diagnostic discharge is used for the diagnosis. When determination is made that the deterioration diagnosis of the second battery 12 is possible in the third diagnostic discharge process, the physical quantity of the second battery 12 acquired by the acquisition unit 72 during the third diagnostic discharge is used for the diagnosis. When the deteriorated state of the second battery 12 is diagnosed, the battery diagnostic process ends.

Step S411

The determination is made that the deterioration diagnosis of the second battery 12 is not possible in the three diagnostic discharge processes. Therefore, the diagnosis unit 74 determines that the state of the second battery 12 is abnormal. When the determination is made that the state of the second battery 12 is abnormal, the battery diagnostic process ends.

Action and Effect

As described above, with the battery diagnostic device 70 according to the embodiment of the present disclosure, when the highly accurate physical quantity capable of being used for the deterioration diagnosis of the second battery 12 by the initial diagnostic discharge process (first diagnostic discharge) cannot be acquired, the diagnostic discharge process (second or third diagnostic discharge) is repeated a plurality of times to acquire the physical quantity. With this process, there is a high possibility that the highly accurate physical quantity can be acquired. Therefore, a chance capable of performing the deterioration diagnosis of the second battery 12 increases.

With the battery diagnostic device 70 according to the present embodiment, the charging is performed until the stored electricity amount in the second battery 12 reaches a predetermined high value in performing the second and third diagnostic discharge processes (second and third diagnostic discharges). With this process, it is possible to prevent the stored electricity amount in the second battery 12 from being excessively reduced even when the second and third diagnostic discharge processes are continuously performed.

With the battery diagnostic device 70 according to the present embodiment, there is a waiting period of the predetermined time (second time) until the third diagnostic discharge process (third diagnostic discharge) is started from the end of the second diagnostic discharge process (second diagnostic discharge). With this process, it is possible to eliminate the influence of the polarization occurring on the second battery 12 on the physical quantity.

Although one embodiment of the present disclosure has been described above, the present disclosure can be regarded as a battery diagnostic device, a battery diagnostic method executed by the battery diagnostic device including a processor and a memory, a control program for executing the battery diagnostic method, a computer-readable non-transitory storage medium that stores the control program, and a vehicle equipped with a battery diagnostic device.

The battery diagnostic device and the like of the present disclosure can be used for diagnosing the state of the battery mounted on the vehicle.

What is claimed is:

1. A battery diagnostic device that diagnoses a state of a battery mounted on a vehicle, the battery diagnostic device comprising:
   a first discharge process unit that performs a first diagnostic discharge that discharges from the battery toward a predetermined in-vehicle device for a first time;
   a first acquisition unit that acquires a physical quantity indicating the state of the battery during the first diagnostic discharge;
   a first determination unit that determines whether or not a deterioration diagnosis of the battery is possible based on the physical quantity acquired by the first acquisition unit;
   a second discharge process unit that performs a second diagnostic discharge that discharges from the battery toward the in-vehicle device for the first time when the first determination unit determines that the deterioration diagnosis of the battery is not possible;
   a second acquisition unit that acquires a physical quantity indicating the state of the battery during the second diagnostic discharge; and
   a diagnosis unit that performs the deterioration diagnosis of the battery based on the physical quantity acquired by the first acquisition unit when the first determination unit determines that the deterioration diagnosis of the battery is possible, and performs the deterioration diagnosis of the battery based on the physical quantity acquired by the second acquisition unit when the first determination unit determines that the deterioration diagnosis of the battery is not possible;
   a second determination unit that determines whether or not the deterioration diagnosis of the battery is possible based on the physical quantity acquired by the second acquisition unit;
   a third discharge process unit that performs a third diagnostic discharge that discharges from the battery toward the in-vehicle device for the first time when the second determination unit determines that the deterioration diagnosis of the battery is not possible;
   a third acquisition unit that acquires a physical quantity indicating the state of the battery during the third diagnostic discharge; and
   a third determination unit that determines whether or not the deterioration diagnosis of the battery is possible based on the physical quantity acquired by the third acquisition unit,
   wherein the diagnosis unit performs the deterioration diagnosis of the battery based on the physical quantity acquired by the second acquisition unit when the second determination unit determines that the deterioration diagnosis of the battery is possible, and performs the deterioration diagnosis of the battery based on the physical quantity acquired by the third acquisition unit when the second determination unit determines that the deterioration diagnosis of the battery is not possible, and
   wherein the diagnosis unit performs the deterioration diagnosis of the battery based on the physical quantity acquired by the third acquisition unit when the third determination unit determines that the deterioration diagnosis of the battery is possible, and diagnoses that the battery is abnormal when the third determination unit determines that the deterioration diagnosis of the battery is not possible.

2. The battery diagnostic device according to claim 1 wherein the second discharge process unit charges the battery until a stored electricity amount reaches a first stored electricity amount before the second diagnostic discharge is performed.

3. The battery diagnostic device according to claim 1, wherein the third discharge process unit performs the third diagnostic discharge after a second time elapses from an end of the second diagnostic discharge by the second discharge process unit.

4. The battery diagnostic device according to claim 1, wherein:
   the physical quantity includes at least an outflow current of the battery; and
   the first determination unit and the second determination unit determine that the deterioration diagnosis of the battery is not possible when an average value of the outflow current of the battery during a discharge period is equal to or higher than a first threshold value.

5. The battery diagnostic device according to claim 1, wherein:
   the physical quantity includes at least an outflow current of the battery; and
   the first determination unit and the second determination unit determine that deterioration diagnosis of the battery is not possible when the outflow current of the battery at the time of a discharge end is equal to or higher than a second threshold value.

6. The battery diagnostic device according to claim 1, wherein:

the battery is a second battery for backing up a first battery that supplies electric power to the in-vehicle device during autonomous driving in a vehicle capable of the autonomous driving; and the first discharge process unit shuts off the first battery and the in-vehicle device and connects the second battery and the in-vehicle device to perform the first diagnostic discharge.

7. A battery diagnostic method that diagnoses a state of a battery mounted on a vehicle, the battery diagnostic method comprising:

a step of performing a first diagnostic discharge that discharges from the battery toward a predetermined in-vehicle device for a first time;

a first acquisition step of acquiring a physical quantity indicating the state of the battery during the first diagnostic discharge;

a step of determining whether or not a deterioration diagnosis of the battery is possible based on the physical quantity acquired in the first acquisition step;

a step of performing the deterioration diagnosis of the battery based on the physical quantity acquired in the first acquisition step when determination is made that the deterioration diagnosis of the battery is possible;

a step of performing a second diagnostic discharge that discharges from the battery toward the in-vehicle device for the first time when determination is made that the deterioration diagnosis of the battery is not possible;

a second acquisition step of acquiring a physical quantity indicating the state of the battery during the second diagnostic discharge; and a step of performing the deterioration diagnosis of the battery based on the physical quantity acquired in the second acquisition step;

a second determination step of determining whether or not the deterioration diagnosis of the battery is possible based on the physical quantity acquired by the second acquisition step;

a step of performing a third diagnostic discharge that discharges from the battery toward the in-vehicle device for the first time when the second determination step determines that the deterioration diagnosis of the battery is not possible;

a third acquisition step that acquires a physical quantity indicating the state of the battery during the third diagnostic discharge; and a third determination step of determining whether or not the deterioration diagnosis of the battery is possible based on the physical quantity acquired by the third acquisition step;

a step of performing the deterioration diagnosis of the battery based on the physical quantity acquired by the second acquisition step when the second determination step determines that the deterioration diagnosis of the battery is possible, and performs the deterioration diagnosis of the battery based on the physical quantity acquired by the third acquisition step when the second determination step determines that the deterioration diagnosis of the battery is not possible; and a step of performing the deterioration diagnosis of the battery based on the physical quantity acquired by the third acquisition step when the third determination step determines that the deterioration diagnosis of the battery is possible, and diagnoses that the battery is abnormal when the third determination step determines that the deterioration diagnosis of the battery is not possible.

8. A non-transitory computer-readable storage medium storing instructions which, when executed by at least one processor of a battery diagnostic device, cause the at least one processor to execute:

a step of performing a first diagnostic discharge that discharges from the battery toward a predetermined in-vehicle device for a first time, a first acquisition step of acquiring a physical quantity indicating the state of the battery during the first diagnostic discharge, a step of determining whether or not a deterioration diagnosis of the battery is possible based on the physical quantity acquired in the first acquisition step, a step of performing the deterioration diagnosis of the battery based on the physical quantity acquired in the first acquisition step when determination is made that the deterioration diagnosis of the battery is possible, a step of performing a second diagnostic discharge that discharges from the battery toward the in-vehicle device for the first time when determination is made that the deterioration diagnosis of the battery is not possible, a second acquisition step of acquiring a physical quantity indicating the state of the battery during the second diagnostic discharge, and a step of performing the deterioration diagnosis of the battery based on the physical quantity acquired in the second acquisition step;

a second determination step of determining whether or not the deterioration diagnosis of the battery is possible based on the physical quantity acquired by the second acquisition step;

a step of performing a third diagnostic discharge that discharges from the battery toward the in-vehicle device for the first time when the second determination step determines that the deterioration diagnosis of the battery is not possible;

a third acquisition step that acquires a physical quantity indicating the state of the battery during the third diagnostic discharge; and a third determination step of determining whether or not the deterioration diagnosis of the battery is possible based on the physical quantity acquired by the third acquisition step;

a step of performing the deterioration diagnosis of the battery based on the physical quantity acquired by the second acquisition step when the second determination step determines that the deterioration diagnosis of the battery is possible, and performs the deterioration diagnosis of the battery based on the physical quantity acquired by the third acquisition step when the second determination step determines that the deterioration diagnosis of the battery is not possible; and a step of performing the deterioration diagnosis of the battery based on the physical quantity acquired by the third acquisition step when the third determination step determines that the deterioration diagnosis of the battery is possible, and diagnoses that the battery is abnormal when the third determination step determines that the deterioration diagnosis of the battery is not possible.

9. A vehicle equipped with the battery diagnostic device according to claim 1.

\* \* \* \* \*